(12) United States Patent
King et al.

(10) Patent No.: US 8,934,492 B1
(45) Date of Patent: Jan. 13, 2015

(54) NETWORK SYSTEMS AND METHODS FOR EFFICIENTLY DROPPING PACKETS CARRIED BY VIRTUAL CIRCUITS

(75) Inventors: Richard Paul King, Madison, AL (US); Andrew T. Ruble, Elkmont, AL (US); Joseph Lee Boyd, Harvest, AL (US)

(73) Assignee: ADTRAN, Inc., Huntsville, AL (US)

( * ) Notice: Subject to any disclaimer, the term of this patent is extended or adjusted under 35 U.S.C. 154(b) by 480 days.

(21) Appl. No.: 12/892,598

(22) Filed: Sep. 28, 2010

(51) Int. Cl.
*H04L 12/28* (2006.01)
(52) U.S. Cl.
USPC .................. 370/397; 370/230; 709/224
(58) Field of Classification Search
None
See application file for complete search history.

(56) References Cited

U.S. PATENT DOCUMENTS

| 6,157,647 A | 12/2000 | Husak |
| 2002/0009088 A1 * | 1/2002 | Donaghey et al. ............ 370/397 |
| 2005/0223102 A1 | 10/2005 | Zhang et al. |
| 2006/0182133 A1 | 8/2006 | Choumaru et al. |
| 2008/0130516 A1 | 6/2008 | You et al. |
| 2008/0215910 A1 | 9/2008 | Gabriel et al. |
| 2008/0288580 A1 | 11/2008 | Wang et al. |
| 2010/0150160 A1 * | 6/2010 | Kinsky et al. ............ 370/395.53 |

* cited by examiner

*Primary Examiner* — Nicholas Sloms
(74) *Attorney, Agent, or Firm* — Maynard Cooper & Gale, P. C.; Jon E. Holland (57) ABSTRACT

The present disclosure generally pertains to network systems and methods that efficiently drop packets carried by virtual circuits. In one exemplary embodiment, a packet network has at least a first node having a first port that is coupled directly to a second port of a second node. A virtual circuit is established such that a virtual connection exists between the two ports. The first node communicates with the second node to determine whether the second node is provisioned such that the second port is a member of the virtual circuit. If the second node is not provisioned such that the second port is a member of the virtual circuit, then the first node drops the data packets that (1) are carried by the virtual circuit and (2) are to be forwarded to the first port, as indicated by virtual circuit (VC) mapping data in the first node. Thus, the dropped packets are prevented from usurping capacity that otherwise could be used to transmit other packets between the two nodes.

16 Claims, 5 Drawing Sheets

| VC ID | Port ID | Drop Indicator |
|---|---|---|
| 2 | 43 | 0 |
| 2 | 44 | 0 |
| 3 | 43 | 0 |
| 4 | 44 | 0 |
| 5 | 43 | 0 |
| 6 | 44 | 0 |
| 7 | 44 | 0 |

FIG. 3

| VC ID | Port ID | Drop Indicator |
|---|---|---|
| 2 | 43 | 1 |
| 2 | 44 | 0 |
| 3 | 43 | 0 |
| 4 | 44 | 0 |
| 5 | 43 | 0 |
| 6 | 44 | 0 |
| 7 | 44 | 0 |

NETWORK SYSTEMS AND METHODS FOR EFFICIENTLY DROPPING PACKETS CARRIED BY VIRTUAL CIRCUITS

RELATED ART

In conventional telecommunication systems, virtual circuits are frequently established within a packet network to control the manner in which packets are switched within the network. In this regard, a virtual circuit (e.g., an Ethernet virtual circuit (EVC) within an Ethernet network) typically provides a virtual connection, such as point-to-point, multipoint-to-multipoint, or rooted multipoint, through a packet network. A virtual circuit is typically implemented via Layer 2 of the Open Systems Interconnection (OSI) model. Each virtual circuit is associated with an identifier, such as a virtual local area network (VLAN) tag or S-tag, that can be used to identify the virtual circuit and to control the switching of packets within the packet network.

In this regard, to implement a virtual circuit (VC) within a packet network, a virtual circuit (VC) identifier is inserted into the overhead of each packet to be carried by the virtual circuit. Further, each network node has a table for mapping VC identifiers to the appropriate ports of the node. When the node receives a packet that is carried by a particular virtual circuit, the node looks up the packet's VC identifier in the node's VC identifier table, which maps the VC identifier to one or more node ports that are members of the virtual circuit. The node then forwards the packet to one or more such ports.

For a virtual circuit to exist from one endpoint to another, each node within the path between the endpoints should be provisioned to support the virtual circuit. Specifically, the VC identifier table of each such node should be provisioned to include at least one mapping for the virtual circuit. Errors in provisioning or otherwise may prevent packets carried by the virtual circuit from successfully reaching the circuit's endpoint.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to network systems and methods that efficiently drop packets carried by virtual circuits. In one exemplary embodiment, a packet network has at least a first node having a first port that is coupled directly to a second port of a second node. A virtual circuit is established such that a virtual connection exists between the two ports. The first node communicates with the second node to determine whether the second node is provisioned such that the second port is a member of the virtual circuit. If the second node is not provisioned such that the second port is a member of the virtual circuit, then the first node drops the data packets that (1) are carried by the virtual circuit and (2) are to be forwarded to the first port, as indicated by virtual circuit (VC) mapping data in the first node. Thus, the dropped packets are prevented from usurping capacity that otherwise could be used to transmit other packets between the two nodes.

Figure 1:
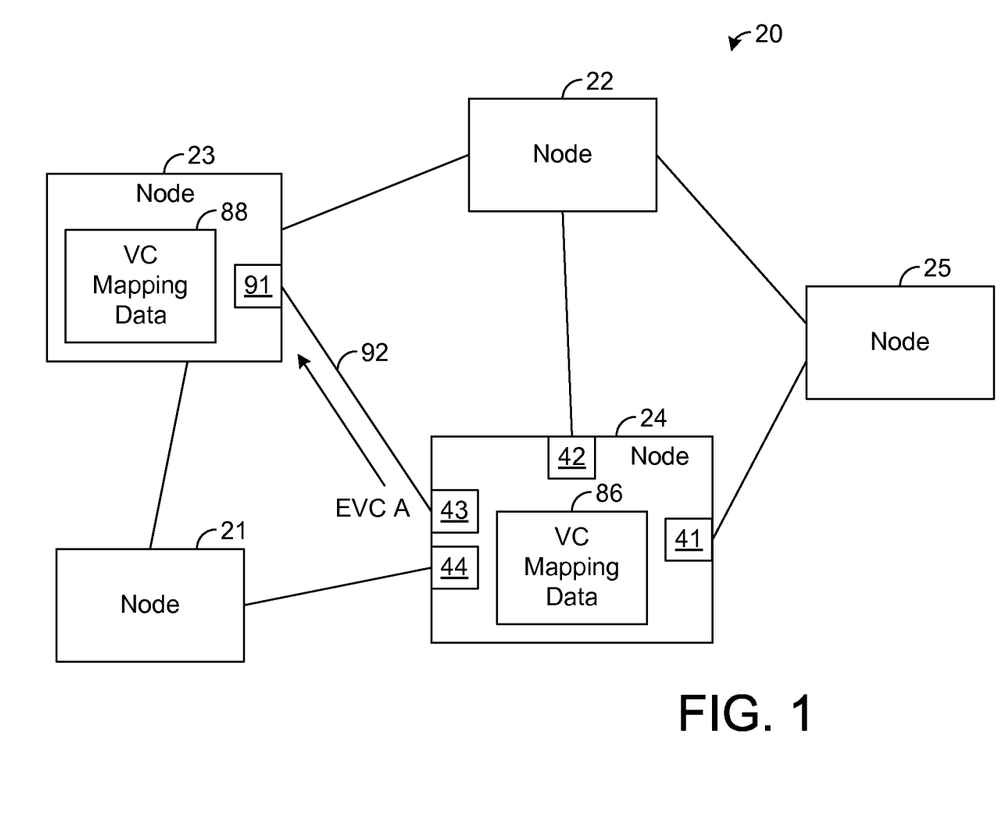
FIG. 1 is a block diagram illustrating an exemplary packet network.

FIG. 1 depicts an exemplary embodiment of a packet network 20 having a plurality of nodes 21-25. There are five nodes 21-25 shown in the exemplary network 20 of FIG. 1 for simplicity of illustration, but the network 20 may have any number of nodes 21-25 in other embodiments. In one exemplary embodiment, the network 20 is an Ethernet network in which each node 21-25 is configured to communicate data packets in accordance with applicable Ethernet protocols, and each node 21-25 is a carrier Ethernet switch. However, in other embodiments, other types of networks and other types of network nodes are possible.

As shown by FIG. 1, each node 21-25 is coupled to and communicates with at least one other node 21-25 of the network 20. In one exemplary embodiment, conductive media, such as twisted wire pairs, are used to couple one node 21-25 to another. However, other types of connections, such as optical fibers, may be used to connect any of the nodes to another node, and it is possible for one or more of the nodes to communicate with another node wirelessly.

In one exemplary embodiment, at least one Layer 2 virtual circuit is established within the network 20, and each packet has a virtual circuit (VC) identifier, such as a VLAN-tag or S-tag, that indicates which virtual circuit is to carry the packet. For example, assume that a virtual circuit is established between at least nodes 23-25. That is, packets having a particular VC identifier and transmitted from the node 25 to the node 24 are transmitted, based on the VC identifier, by the node 24 to the node 23 such that a virtual connection for the virtual circuit exists between the nodes 23 and 24. Each node within the virtual circuit has VC mapping data that indicates how to transport data packets carried by the virtual circuit. Such VC mapping data will be described in more detail hereafter.

Figure 2:
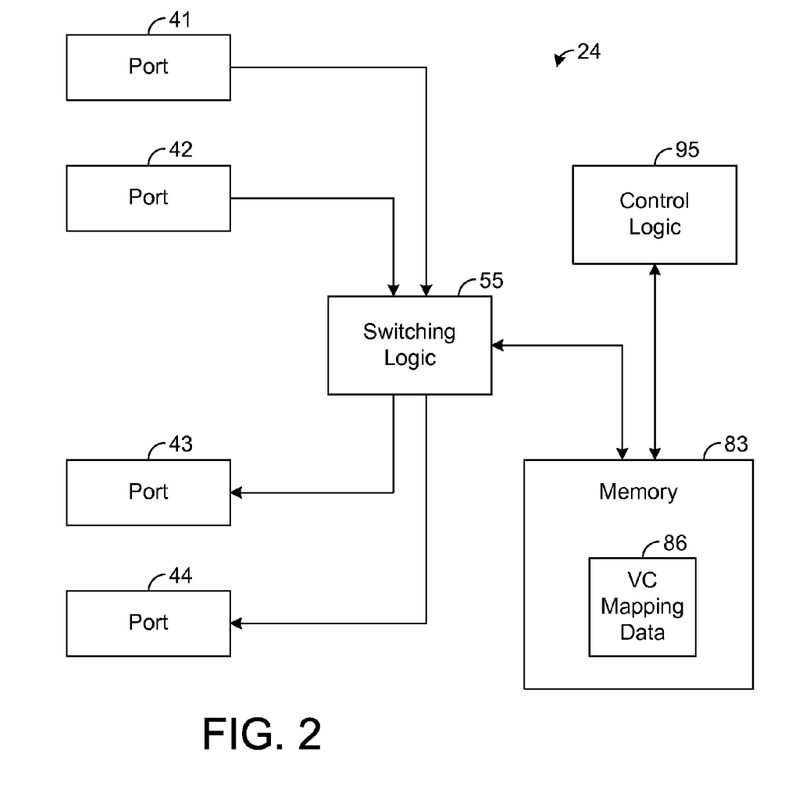
FIG. 2 is a block diagram illustrating an exemplary node of a packet network, such as is depicted by FIG. 1.

FIG. 2 depicts an exemplary embodiment of a node 24 of the network 20. As shown by FIG. 2, the node 24 has a plurality of ports 41-44 for transmitting and/or receiving data to and/or from external devices, such as other nodes of the network 20. In the exemplary embodiment shown by FIG. 2, the ports 41 and 42 receive data packets from other nodes of the network 20, and the ports 43 and 44 transmit data packets to other nodes of the network 20. As an example, the port 41 may be coupled directly to the node 25 and receive data packets from this node 25. In addition, the port 43 may be coupled directly to the node 23 and transmit data packets to this node 23. However, other numbers of ports 41-44 are possible in other embodiments, and it is possible for any port 41-44 to both receive and transmit data or, in other words, be bi-directional.

As shown by FIG. 2, each port 41-44 is coupled to switching logic 55 that is configured to forward packets from the ports 41 and 42 to the ports 43 and 44. In this regard, the switching logic 55 is configured to receive packets from the ports 41 and 42 and to determine which of the ports 43 and 44 are to transmit such packets from the node 24. For any data packet that is carried by a virtual circuit, the port 43 or 44 selected for transmission by the switching logic 55 is based on the packet's VC identifier. In this regard, the node 24 has memory 83 storing VC mapping data 86 that maps VC identifiers to port identifiers. Note that the VC identifier used in the packets to identify a particular virtual circuit may be the same as a VC identifier that is used in the VC mapping data 86 to identify the same virtual circuit. However, it is possible for a VC identifier used in a packet to identify a particular virtual circuit to be different than (e.g., have a different value) than a VC identifier that is used in the VC mapping data 86 to identify the same virtual circuit.

In the exemplary embodiment described above in which a virtual circuit exists between nodes 23-25, the VC mapping data 86 has an entry that maps a VC identifier identifying such virtual circuit to a port identifier that identifies the port 43, thereby indicating that the port 43 is a member of the virtual circuit. The switching logic 55, based on such mapping, forwards the data packets having the foregoing VC identifier to the port 43 such that the data packets are ultimately transmitted to the node 23. In this regard, as shown by FIG. 1, assume that port 43 of the node 24 is coupled to a port 91 of the node 23 via a communication connection 92, such as a twisted pair or optical fiber.

Note that all packets having a VC identifier identifying the foregoing virtual circuit are not necessarily forwarded to the port 43. In this regard, it is possible for a VC identifier to be mapped to more than one port 43 and 44. The VC mapping data 86 may include other attributes, such as MAC addresses, that can be used to deterministically make a forwarding decision among a plurality of ports that are members of the virtual circuit. Techniques for making forwarding decisions for packets are generally well known and will not be described in detail herein.

Figure 3:
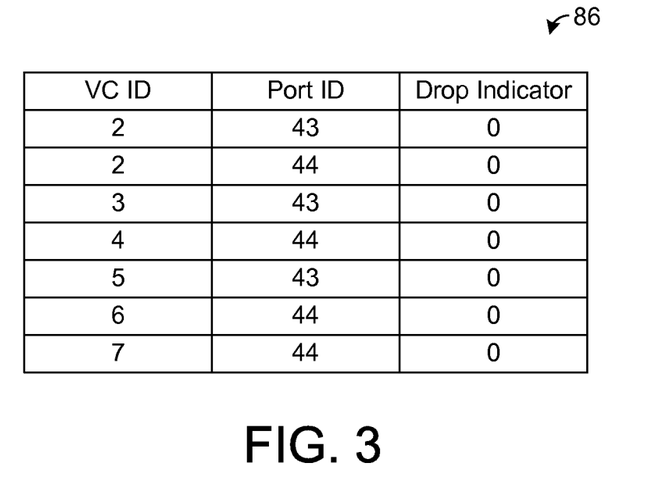
FIG. 3 is a block diagram illustrating exemplary VC mapping data, such as is depicted by FIG. 2.

FIG. 3 shows an exemplary embodiment of the VC mapping data 86. The exemplary VC mapping data 86 of FIG. 3 is implemented as a data table having a plurality of entries, but other configurations of the data 86 are possible. Each entry stores a VC identifier (ID), a port identifier (ID), and a drop indicator, which will be described in more detail hereafter. Further, as described above, each entry may include other attributes (not shown in FIG. 3), such as MAC addresses, on which forwarding decisions can be based. According to the exemplary VC mapping data 86 of FIG. 3, the node 24 is configured to support six different virtual circuits, each associated with a different VC identifier ranging in value from "2" to "7." Each entry also stores a port identifier that is mapped to the VC identifier within the same entry. In FIG. 3, a port identifier "43" identifies the port 43, and a port identifier "44" identifies the port 44. Thus, according to the exemplary data 86 shown by FIG. 3, data packets carried by a virtual circuit identified in the data 86 by a VC identifier of "2," "3," or "5" may be mapped to a port identifier identifying the port 43 and may, therefore, be forwarded to the port 43. Further, data packets carried by a virtual circuit identified in the data 86 by a VC identifier of "2," "4," "6," or "7" may be mapped to a port identifier identifying the port 44 and may, therefore, be forwarded to the port 44.

Note that the other nodes 21-23 and 25 of the network 20 may be configured similar to the exemplary node 24 shown by FIG. 2. Indeed, each node 21-25 of the network 20 may store VC mapping data indicative of how the node is to transport data packets based on its respective VC identifiers, as described above for the exemplary node 24 shown by FIG. 2. For example, referring to FIG. 1, the node 23 stores VC mapping data 88 that maps VC identifiers to port identifiers for the ports of the node 23. The node 23 uses the VC mapping data 88 to determine which ports are to be used to transmit data packets in the same manner that the node 24 uses the VC mapping data 86, as described above.

As indicated above, a virtual connection for a particular virtual circuit exists between the nodes 23 and 24 such that the node 24 transmits to the node 23 data packets that are carried by the virtual circuit. Ideally, the VC mapping data 88 of the node 23 has an entry mapping a VC identifier identifying such virtual circuit to a port identifier identifying the port 91 that is coupled directly to the node 24 via connection 92.

However, due to an error in configuring the node 23 or otherwise, the node 23 may not be adequately configured to transport data packets that are to be carried by the foregoing virtual connection. For example, during provisioning, a technician may erroneously fail to define an entry for the virtual circuit such that the VC mapping data 88 is missing a VC identifier that identifies such virtual circuit. In such a situation, the node 23 drops data packets that are to be carried by the virtual connection to the node 24. In other words, the node 23 discards such data packets without transmitting them from the node 23. In particular, upon receipt of a data packet that is carried by the virtual circuit, logic within the node 23 consults the VC mapping data 88 based on the packet's VC identifier and possibly other attributes to determine to which port the data packet is to be forwarded. However, the logic is unable to find a VC identifier in the VC mapping data 86 that identifies the same virtual circuit as the packet's VC identifier, and the logic is, therefore, unable to determine to which port the data packet should be forwarded. Thus, the logic discards the data packet without transmitting it from the node 23.

In one exemplary embodiment, the node 24 is configured to communicate with at least one other node directly coupled to it via a communication connection in order to determine which virtual circuits are adequately supported by the other node for such connection. Note that one node is directly coupled to another when it is the next hop for a data packet transmitted from the other node. Thus, there are no intervening nodes between two nodes that are directly coupled to each other. As used herein, a node is referred to as being "adjacent" to another node when it is directly coupled to the other node such that no intervening nodes exists between the two nodes.

If the node 24 determines that an adjacent node is not adequately configured to support a virtual circuit having a virtual connection between the node 24 and the adjacent node (e.g., not sufficiently configured to transport data packets that are carried by the virtual circuit), then the node 24 is configured to drop data packets that are to be carried by this virtual connection. Accordingly, the node 24 does not consume bandwidth and/or resources attempting to transmit a data packet to the adjacent node when the adjacent node is not configured to transport the data packet and, therefore, will drop the data packet.

There are various techniques that can be used to determine whether an adjacent node is sufficiently configured to transport data packets that are carried by a particular virtual circuit. In one exemplary embodiment, the nodes 21-25 are configured to exchange VC mapping data with adjacent nodes so that each node can determine whether an adjacent node is sufficiently configured to transport data packets that are carried by various virtual circuits. If the VC mapping data received from an adjacent node does not indicate that the adjacent node is provisioned such that its port for a virtual connection between the two nodes is, in fact, a member of a particular virtual circuit, then it is determined that the adjacent node is not sufficiently configured to transport data packets that are carried by this virtual circuit.

As an example, in the embodiment described above in which a virtual connection exists between the ports 43 and 91, the nodes 23 and 24 may be configured to exchange VC mapping data 86 and 88. That is, the node 24 is configured to transmit at least a portion of the VC mapping data 86 to the node 23, and the node 23 is configured to transmit at least a portion of the VC mapping data 88 to the node 24. In one exemplary embodiment, the node 24 transmits each VC identifier of the data 86 that is mapped to the port 43, and the node 23 transmits each VC identifier of the data 88 that is mapped to the port 91. Control logic 95 (FIG. 2) of the node 24 is configured to then search the received VC mapping data 88 for a VC identifier that identifies a virtual circuit having a virtual connection across the data connection 92. If the control logic 95 is unable to find such VC identifier in the received data 88, the control logic 95 configures the node 24 to drop data packets that are to be carried by this virtual connection. Thereafter, if the node 24 receives a data packet that is carried by the foregoing virtual circuit (i.e., has a VC identifier that identifies the virtual circuit) and is to be forwarded to the port 43, the node 24 drops the data packet rather than transmitting it to the node 23 where the packet would likely have been dropped anyway. Accordingly, the node 24 does not waste bandwidth or burden resources trying to transmit the data packet to the node 23.

In addition, there are various techniques that may be used to track which data packets should be dropped by a node. In one exemplary embodiment, when the control logic 95 determines that data packets carried by a particular virtual circuit and mapped to a particular port are to be dropped, the control logic 95 updates the VC mapping data 86 to so indicate. In this regard, the VC mapping data 86 correlates each entry of the data 86 with an indicator, referred to as a "drop indicator," that indicates whether the node 24 is to drop data packets that are correlated with such entry.

Figure 4:
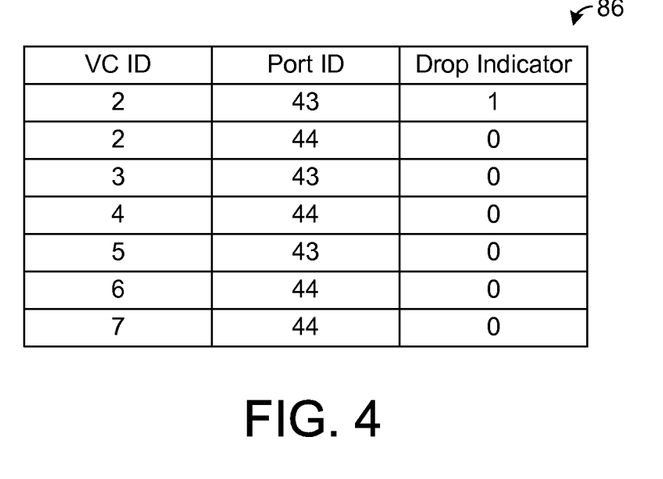
FIG. 4 is a block diagram illustrating the VC mapping data of FIG. 3 after such data has been updated to indicate that data packets for a virtual circuit are to be dropped.

FIG. 3 depicts exemplary VC mapping data 86 of the node 24 having a drop indicator in each entry. In the example shown by FIG. 3, the drop indicator is a one bit value. A value of "1" for the drop indicator indicates that correlated data packets are to be dropped, and a value of "0" for the drop indicator indicates that correlated data packets are not to be dropped. In the example shown by FIG. 3, all of the drop indicators are assigned a value of "0" indicating that no packets are to be dropped. However, FIG. 4 shows the VC mapping data 86 after the drop indicator of the entry having the VC identifier "2" for port 43 has been updated to a value of "1" indicating that data packets correlated with such entry are to be dropped. Thus, when the node 24 receives a data packet that (1) has a VC identifier identifying the same virtual circuit that is identified by the VC identifier of "2" in the data 86 and (2) is to be forwarded to the port 43, the node 24 is configured to drop such data packet based on the VC mapping data 86. In other embodiments, other types of drop indicators may be employed, and other techniques for indicating which packets are to be dropped are possible.

In one exemplary embodiment, the process of conveying VC mapping data between nodes is repeated from time-to-time so that the drop indicators can be appropriately updated based on the present state of the nodes 21-25. Thus, if the drop indicator for a particular virtual circuit indicates that data packets are to be dropped because an adjacent node that would have otherwise received the data packets is not sufficiently configured to transport the data packets, then the drop indicator may be later updated to indicate that the data packets are not to be dropped once the configuration of the adjacent node is changed so that it is sufficiently configured to transport the data packets.

If desired, once a node determines to drop data packets that are carried by a particular virtual circuit, the node may communicate with other nodes such that the data packets are dropped at an earlier point in the network 20. For example, in the example described above in which a virtual connection of a virtual circuit exists between the nodes 23 and 24, assume that the node 24 determines that the node 23 is not sufficiently configured to transport data packets that are carried by a particular virtual circuit. If desired, the node 24 may notify another node, such as node 25, that is within the virtual circuit and that transmits data packets carried by the virtual circuit to the node 24 so that the node 25 may thereafter drop the data packets. However, attempting to update such other nodes may complicate the architecture of the network 20 particularly considering that the configuration of the node 23 may change from time-to-time. In this regard, depending on the architecture of the network 20, the node 24 may be unaware of which of the other nodes 21-23 and 25 are configured to transmit the data packets of a particular virtual circuit to the node 24. In addition, any node that is configured to drop data packets carried by a virtual circuit due to the inability of the node 23 to transport such data packets should be later updated to refrain from dropping the data packets once the configuration of the node 23 is updated to transport the data packets.

For simplicity and to help ensure a more robust network 20, the dropping of data packets when a node is not sufficiently provisioned to transport data packets of a particular virtual circuit is limited to the adjacent nodes. For example, once the node 24 determines that the node 23 does not adequately support a virtual circuit, then the node 24 updates its VC mapping data 86 to indicate that the node 24 is to drop data packets of the virtual circuit, as described above. However, in one exemplary embodiment, the node 24 does not propagate this information to the other nodes 21, 22, and 25. Thus, the failure of the node 23 to adequately support the virtual circuit does not cause these other nodes 21, 22, and 25 to drop the packets carried by such virtual circuit at an earlier point in the network 20. For example, if the node 25 is within the foregoing virtual circuit, the node 25 continues to transmit data packets that are carried by the virtual circuit to the node 24 at which point the packets are dropped by the node 24.

In addition, in one exemplary embodiment, the switching logic 55 and the control logic 95 of FIG. 2 are both implemented in hardware. However, in other embodiments, it is possible for any such components to be implemented in hardware, software, firmware, or any combination thereof. If any portion of the node 24 is implemented in software or firmware, then the node 24 may comprise an instruction execution apparatus, such as a processor, for executing instructions of the software or firmware.

It should be noted that various techniques and channels may be used by a node to discover whether an adjacent node is sufficiently provisioned to transport data packets that are carried by a particular virtual circuit. In one exemplary embodiment, the packet network 20 is an Ethernet network, and Ethernet virtual circuit (EVC) Advertisement is used to communicate EVC provisioning information between adjacent nodes. In this regard, current Ethernet standards define a control channel, referred to as Operations, Administration, and Maintenance (OAM), that allows nodes to discover information regarding various control parameters about other nodes in an Ethernet network. In Ethernet OAM, the nodes communicate control information to one another via control packets.

Each such control packet has a data field and an operational (op) code that indicates the type of information carried in the data field. Per current OAM standards, at least one op code is defined to indicate that the information in the data field is vendor-specific such that a vendor may use the data field to transport any desired information without violating Ethernet protocol. As used herein, "EVC Advertisement" refers to a vendor-specific protocol that allows Ethernet OAM messages to be used to transport EVC provisioning information as described herein. An EVC Advertisement message refers to a message in accordance with EVC Advertisement protocol. In one exemplary embodiment, an EVC Advertisement message is an Ethernet OAM control packet that has its op code set to indicate that the information in the packet's data field is vendor-specific. As will be described in more detail hereafter, such EVC Advertisement messages are used in one exemplary embodiment to carry the VC mapping data of one node to an adjacent node.

In this regard, once the node 24 is coupled to the node 23 as shown by FIG. 1, each of the nodes 23 and 24 is configured to determine whether the other is EVC Advertisement compatible so that EVC Advertisement messages communicated from one node can be successfully interpreted by the other node. If so, the nodes 23 and 24 use EVC Advertisement messages to exchange provisioning information so that either of the nodes 23 and/or 24 may decide to drop messages based on the provisioning of the other node, as described herein. In this regard, if both of the nodes 23 and 24 are EVC Advertisement compatible, the node 23 is configured to transmit, to the node 24, VC identifiers of the VC mapping data 88 for the port 91 via EVC Advertisement messages. The control logic 95 of the node 24 then compares these VC identifiers to the ones in the VC mapping data 88 for port 43 to determine whether to drop data packets. In this regard, if the VC mapping data 88 maps a VC identifier to the port 43 coupled to the node 23 but a VC identifier identifying the same virtual circuit as the one mapped to the port 43 is not received in the VC mapping data 86 from the node 23, then the control logic 95 of the node 24 adjusts the drop indicator correlated with such VC identifier in the data 88 to indicate that the data packets identifying the same virtual circuit and mapped to the port 43 are to be dropped by the node 24.

In addition, if both of the nodes 23 and 24 are EVC Advertisement compatible, the control logic 95 of the node 24 is configured to transmit to the node 23, VC identifiers of the VC mapping data 86 for the port 43 to the node 23, which similarly uses such VC identifiers to determine whether to drop data packets that otherwise would have been transmitted to the node 24. After an initial exchange of provisioning information (e.g., VC identifiers), each node 23 and 24 is configured to transmit VC identifiers of its respective VC mapping data 88 and 86 to the other node each time its VC mapping data is updated (e.g., re-provisioned). Thus, the drop indicators are appropriately updated over time as the VC mapping data at either node 23 or 24 changes.

Although, EVC Advertisement messaging provides a channel for communicating provisioning information from one node to another, as described herein, such provisioning information may be communicated between the nodes via other techniques and protocols, if desired.

Note that if one node 23 or 24 attempts to exchange its VC mapping data with the other, but the other node does not reply with its VC mapping data, then the node 23 or 24 is aware that the other is not configured to enable packet dropping according to the embodiments described herein. For example, assume that the node 24 transmits VC identifiers of the VC mapping data 86 to the node 23 via EVC Advertisement messages or otherwise, as described above. If the node 24 does not receive an expected reply, such as VC identifiers of the VC mapping data 88, within a specified time period, then the node 24 assumes that the node 23 is not configured to enable packet dropping, as described herein. In such case, the control logic 95 sets the drop indicator in the tag mapping data 86 for each entry correlated with the port 43 to a value of "0" to indicate that no packets carried by the virtual connection between the nodes 23 and 24 should be dropped based on the data 86.

Accordingly, a node 24 configured according to the instant disclosure may be deployed in networks that include conventional node, which are not configured to enable packet dropping as described herein. If a node adjacent to such deployed node 24 enables packet dropping, as described herein, then the two nodes may exchange VC mapping data and selectively drop packets as described herein, thereby increasing the overall efficiency of the network 20. However, if the adjacent node is not configured to enable packet dropping, then the node 24 operates similar to conventional nodes by not dropping data packets based on the provisioning of the adjacent node, and the deployment of the node 24 does not cause any errors or otherwise degrade the performance of the network 20.

Also note that any of the nodes of the network 20, like the node 24 described above, may be configured to communicate with adjacent nodes and to drop data packets that otherwise would have been transmitted to the adjacent nodes if the adjacent nodes are not sufficiently configured to transport the data packets.

An exemplary use and operation of the network 20 will now be described hereafter with particular reference to FIGS. 5 and 6.

For illustrative purposes, assume that the network 20 is an Ethernet network and each of the nodes 21-25 is a carrier Ethernet switch of the network 20. Also assume that an Ethernet virtual circuit (EVC), referred to hereafter as "EVC A," is established such that there is a virtual connection between the nodes 23 and 24. In particular, data packets having a particular VC identifier that identifies the EVC A are to be transmitted by the node 24 to the node 23 via connection 92. For illustrative purposes, assume that the value of this VC identifier in the packets is "27."

The node 24 is provisioned by a technician to transmit data packets that are carried by the EVC A to the node 23. In this regard, the VC mapping data 86 is defined to include a VC identifier, which has a value of "2" in this example, that identifies EVC A, and the data 86 maps such VC identifier to a port identifier that identifies the port 43 coupled directly to the node 23. For illustrative purposes assume that this port identifier has a value of "43." Since the port 43 is coupled directly to the node 23, any data packets transmitted from the port 43 should be received by the node 23 via connection 92.

Further assume that the VC mapping data 86 is provisioned according to FIG. 3. Note that the first entry, which has a VC identifier value of "2" and a port identifier of "43," corresponds to the EVC A, which has a virtual connection between the nodes 23 and 24. In addition, the drop indicator for each entry is initialized to a value of "0" indicating that the node 24 is not to drop any data packets based on the VC mapping data 86.

Figure 5:
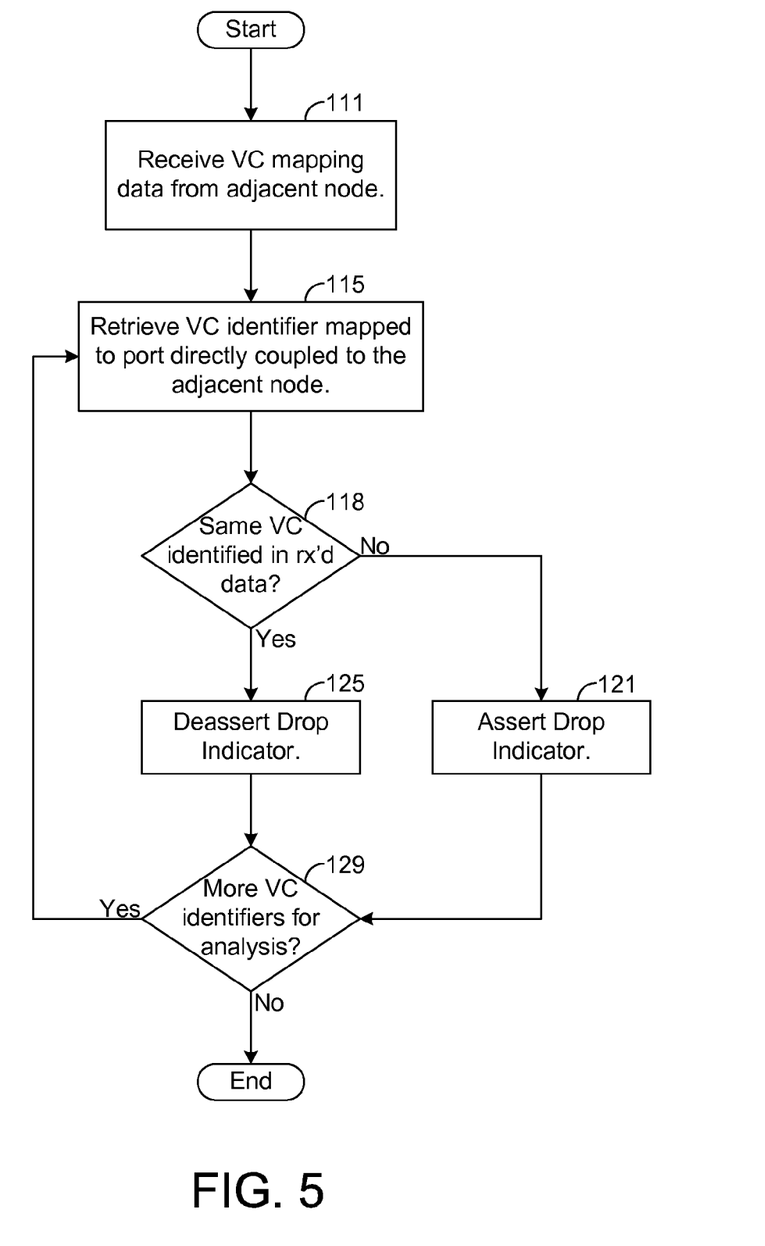
FIG. 5 is a flow chart illustrating an exemplary method for updating VC mapping data, such as is depicted by FIG. 3.
Figure 6:
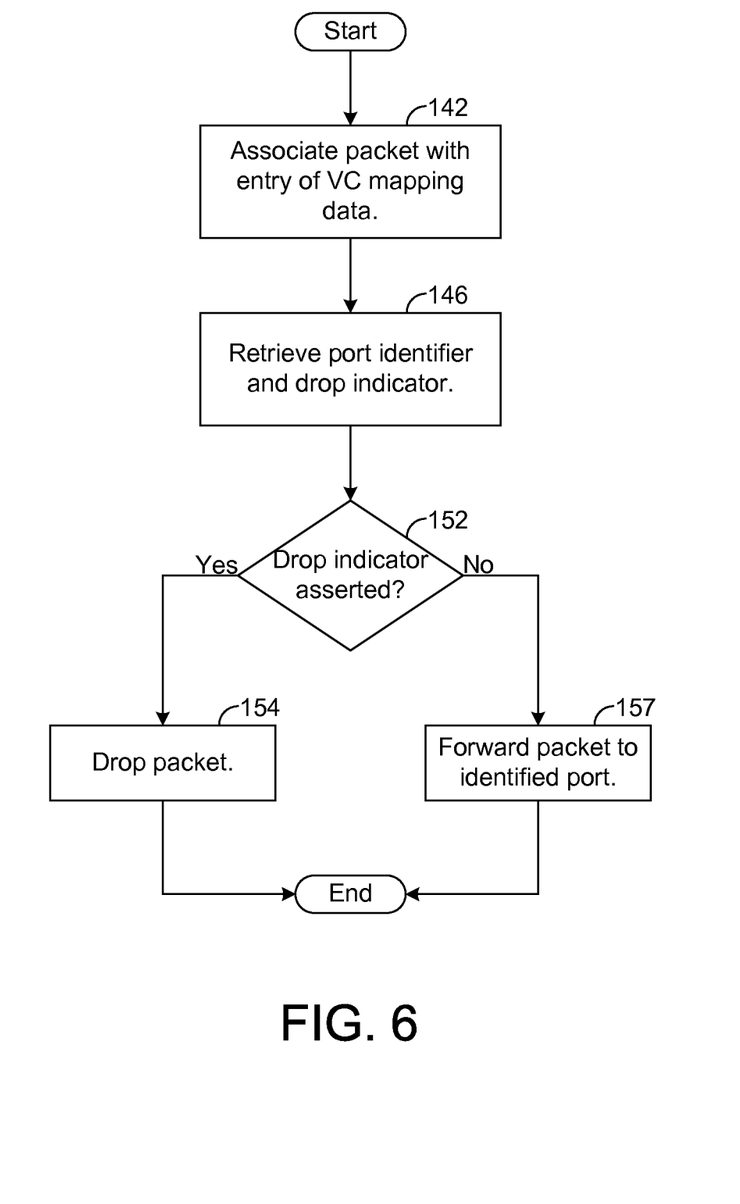
FIG. 6 is a flow chart illustrating an exemplary method for processing a data packet received by a network node, such as is depicted by FIG. 2.

As shown by block 111 of FIG. 5, the node 24 receives VC mapping data 88 from the node 23. In one exemplary embodiment, such VC mapping data 88 is automatically transmitted to the node 24 by the node 23 in response to an update to such VC mapping data 88 (e.g., a provisioning or re-provisioning of the data 88 in the node 23). In particular, the node 23 transmits each VC identifier in the data 88 that is mapped to the port identifier of the port 91. That is, each VC identifier identifying a virtual circuit to which the port 91 is a member, as indicated by the data 88, is transmitted to the node 24 via connection 92. The control logic 95 of the node 24 compares the VC mapping data 88 from the node 23 with the VC mapping data 86 of the node 24 to determine whether any of the drop indicators of the VC mapping data 86 should be updated. There are various techniques that may be used to compare the VC mapping data 86 and 88.

In one exemplary embodiment, the control logic 95 retrieves, from the VC mapping data 86, VC identifiers that are mapped to the port identifier identifying the port 43 that is coupled to and transmits to the node 23, as shown by block 115 of FIG. 5. Since the VC mapping data 86 indicates that packets having such identifiers may be transmitted to the node 23 via the port 43, the VC mapping data 88 from the node 23 ideally should include VC identifiers that identify the same virtual circuits as those identified by the VC identifiers retrieved by the control logic 95. If the VC mapping data 88 from the node 23 does not include a VC identifier that identifies the same virtual circuit as one of the VC identifiers retrieved from the data 88 of the node 24, then the node 23 is not provisioned to indicate that the port 91 is a member of such virtual circuit.

For illustrative purposes, assume that the control logic 95 retrieves from the data 86 the VC identifier associated with EVC A in block 115. As indicated above, this VC identifier has a value of "2." The control logic 95 compares the value of the retrieved VC identifier to the VC identifiers in the VC mapping data 88 received from the node 23 in order to determine whether the retrieved VC identifier identifies the same virtual circuit as any of the VC identifiers in the VC mapping data 88, as shown by block 118. If the same VC identifier value is used in both nodes 23 and 24 to identify such virtual circuit, then the foregoing may be achieved by determining whether any of the VC identifiers in the received data 88 matches the VC identifier retrieved from the data 86.

For illustrative purposes, assume that the node 23 has been erroneously provisioned such that the VC mapping data 88 does not include, for the port 91, a VC identifier of EVC A. Thus, if the node 23 receives a data packet that is carried by EVC A, the node 23 may drop this packet rather than transport it to another node of the network 20 or other device external to the node 23. In such an example, the control logic 95 is unable to locate a VC identifier of EVC A in the VC mapping data 88 and, therefore, makes a "no" determination in block 118. In response, the control logic 95 asserts the drop indicator correlated with the VC identifier of EVC A for port 43 in the VC mapping data 86 stored at node 24 such that the value of this drop indicator is changed to a value of "1," as shown by FIG. 4 and block 121 of FIG. 5. If a VC identifier of EVC A had been in the VC mapping data 88 such that the control logic 95 made a "yes" determination in block 118, then the control logic 95 would have instead deasserted the drop indicator correlated with the VC identifier of EVC A in the VC mapping data 86 such that the value of this drop indicator would be "0," as shown by block 125 of FIG. 5.

In block 129 of FIG. 5, the control logic 95 determines whether each VC identifier in the VC mapping data 86 correlated with the port identifier of port 43 has been retrieved and analyzed. If not, the control logic 95 returns to block 115 in order to retrieve and analyze another VC identifier. Accordingly, the control logic 95 eventually also retrieves and analyzes the VC identifiers having values "3" and "5" from the VC mapping data 86 since these VC identifiers are each correlated with the port identifier of port 43. However, assume that the VC mapping data 88 received from the node 23 includes VC identifiers having values "3" and "5" such that the drop indicators for the VC identifiers of "3" and "5" in the data 86 are deasserted.

After the drop indicator for the VC identifier of EVC A for port 43 is updated to a value of "1," thereby indicating that the node 24 is to drop packets that (1) are carried by EVC A and (2) are to be forwarded to the port 43, assume that the node 24 receives a data packet from the node 25 having a VC identifier that identifies EVC A. Upon receiving such packet, the switching logic 55 of the node 24 searches the VC mapping data 86 and associates an entry of such data 86 with the received packet, as shown by block 142 of FIG. 6. Such entry has a VC identifier identifying EVC A and indicates to which port 43 or 44 the packet is to be forwarded. Upon finding the associated entry, the switching logic 55 retrieves the entry's port identifier and drop indicator, as shown by block 146 of FIG. 6. The switching logic 55 then analyzes the entry's drop indicator in block 152 to determine whether the data packet is to be dropped. In the instant example, assume that the packet is to be forwarded to port 43 and the drop indicator is, therefore, asserted indicating that packets associated with the entry are to be dropped, as shown by FIG. 4. Thus, the switching logic 55 drops the data packet, as shown by block 154 of FIG. 6. In this regard, the switching logic 55 discards the packet without the packet being transmitted to the node 23.

Now assume that, after a period of time, the process shown by FIG. 5 is repeated. However, prior to the exchanging of VC mapping data in block 111, assume that the VC mapping data 88 has been updated to include a VC identifier of EVC A for port 91 such that the data 88 now indicates that the port 91 is a member of EVC A. In such an example, the control logic 95 deasserts the drop indicator in the VC mapping data 86 correlated with the VC identifier of EVC A (i.e., the VC identifier having a value of "2" in the instant example) and the port identifier of port 43. Thus, the foregoing drop indicator is changed to a value of "0," as shown by FIG. 3, indicating that the node 24 should not drop packets that (1) have a VC identifier identifying EVC A and (2) are to be forwarded to the port 43.

After the drop indicator is deasserted, assume that the node 24 again receives a data packet from the node 25 having a VC identifier that identifies EVC A. Upon receiving such packet, the switching logic 55 of the node 24 searches the VC mapping data 86 and associates an entry of such data 86 with the received packet, as shown by block 142 of FIG. 6. Such entry has a VC identifier identifying EVC A and indicates to which port 43 or 44 the packet is to be forwarded. Upon finding the associated entry, the switching logic 55 retrieves the entry's port identifier and drop indicator, as shown by block 146 of FIG. 6. The switching logic 55 then analyzes the entry's drop indicator in block 152 to determine whether the data packet is to be dropped. In the instant example, assume that the entry indicates that the packet is to be forwarded to the port 43. The drop indicator of such entry is now deasserted indicating that packets associated with the entry are not to be dropped. Thus, the switching logic 55 forwards the data packet to the port identified by the retrieved port identifier, as shown by block 157 of FIG. 6. Thus, in the instant example, the switching logic 55 transmits the data packet to the port 43 such that the packet is eventually received by the node 23 via the connection 92.

The invention claimed is:

1. A packet network, comprising:
   a first node having a first port; and
   a second node having a second port coupled to the first port of the first node, the second node having memory configured to store virtual circuit (VC) mapping data for mapping VC identifiers to port identifiers, each of the port identifiers identifying a respective port of the second node, wherein the VC mapping data has a mapping that maps the VC identifier identifying the virtual circuit to the port identifier identifying the second port, the second node configured to communicate with the first node to determine whether the first node is provisioned such that the first node would drop data packets received via the first port and carried by a virtual circuit identified by a VC identifier that is mapped by the VC mapping data to a port identifier identifying the second port, the second node further configured to determine, based on the mapping, to update the VC mapping data, in response to a determination that the first node is provisioned such that the first node would drop data packets received via the first port and carried by the virtual circuit, such that the second node is configured to drop data packets carried by the virtual circuit.

2. The network of claim 1, wherein the first node is a carrier Ethernet switch and wherein the second node is a carrier Ethernet switch.

3. The network of claim 1, wherein the VC mapping data correlates the VC identifier with a drop indicator indicating whether the second node is to drop data packets that are carried by the virtual circuit.

4. The network of claim 1, wherein the data received from the first node is transmitted from the first node to the second node via at least one Ethernet Operations, Administration, and Maintenance (OAM) packet.

5. The network of claim 1, wherein the data from the first node comprises at least one VC identifier identifying at least one virtual circuit.

6. The network of claim 5, wherein the second node is configured to compare the at least one VC identifier and the VC mapping data.

7. The network of claim 6, wherein the second node is configured to update the VC mapping data, based on a comparison of the at least one VC identifier to the VC mapping data, such that the second node is configured to drop data packets carried by the virtual circuit.

8. A node of a packet network comprising:
a first port coupled to a second port of an adjacent node of the packet network;
memory configured to store victual circuit (VC) mapping data, wherein the VC mapping data has a mapping that maps a VC identifier identifying a virtual circuit to a port identifier identifying the first port; and
logic configured to receive, from the adjacent node, data indicative of whether the second port is a member of the virtual circuit, wherein the logic is configured to receive a data packet that is carried by the virtual circuit and to drop the received data packet based on the data if the data does not indicate that the adjacent node is provisioned such that the second port is a member of the virtual circuit, wherein the logic is configured to transmit the data packet to the second port via the first port if the data indicates that the adjacent node is provisioned such that the second port is a member of the virtual circuit, wherein the logic is provisioned to transmit at least one data packet to the adjacent node via the first port when the received data packet is dropped based on the data, wherein the logic is configured to determine to drop the received data packet in response to a determination that the data from the adjacent node indicates that the adjacent node is not a member of the virtual circuit when the mapping maps the VC identifier to the first port that is coupled to the adjacent node, and wherein the logic is configured to drop the received data packet based on the mapping.

9. The node of claim 8, wherein the logic is configured to receive the data via at least one Ethernet Operations, Administration, and Maintenance (OAM) packet comprising the data.

10. The node of claim 8, wherein the logic is configured to compare the VC identifier to the data from the adjacent node.

11. The node of claim 10, wherein the logic is configured to determine whether to drop the data packet based on a comparison of the VC identifier to the data from the adjacent node.

12. A method, comprising the steps of:
communicating between a first node of a packet network and a second node of the packet network, wherein the first node is adjacent to the second node;
storing virtual circuit (VC) mapping data in memory of the second node, the VC mapping data mapping VC identifiers to port identifiers identifying ports of the second node;
determining, based on the communicating step, whether the first node is provisioned such that the first node would drop data packets received by the first node from a port of the second node and carried by a virtual circuit identified by a VC identifier that is mapped by the VC mapping data to a port identifier identifying the port;
receiving, at the second node of the packet network, a data packet that is carried by the virtual circuit, the second node coupled to the first node via the port; and
determining that the VC identifier is mapped by the VC mapping data to the port identifier identifying the port; and
dropping, at the second node, the received data packet in response to each of the determining steps.

13. The method of claim 12, wherein the communicating step comprises the step of communicating between the first node and the second node via at least one Ethernet Operations, Administration, and Maintenance (OAM) packet.

14. The method of claim 12, wherein the VC mapping data correlates a drop indicator with the VC identifier, and wherein the updating step comprises the step of updating the drop indicator in response to the determining whether the first node is provisioned step.

15. The method of claim 12, further comprising the step of updating the second node in response to the determining whether the first node is provisioned step such that the second node is configured to drop data packets carried by the virtual circuit while the second node is configured to transmit data packets to the first node.

16. The packet network of claim 1, wherein the second node is configured to update the VC mapping data, in response to the determination, such that the second node is configured to drop data packets carried by the virtual circuit while the second node is configured to transmit at least one data packet to the first node via the second port.

* * * * *